Figure 1:
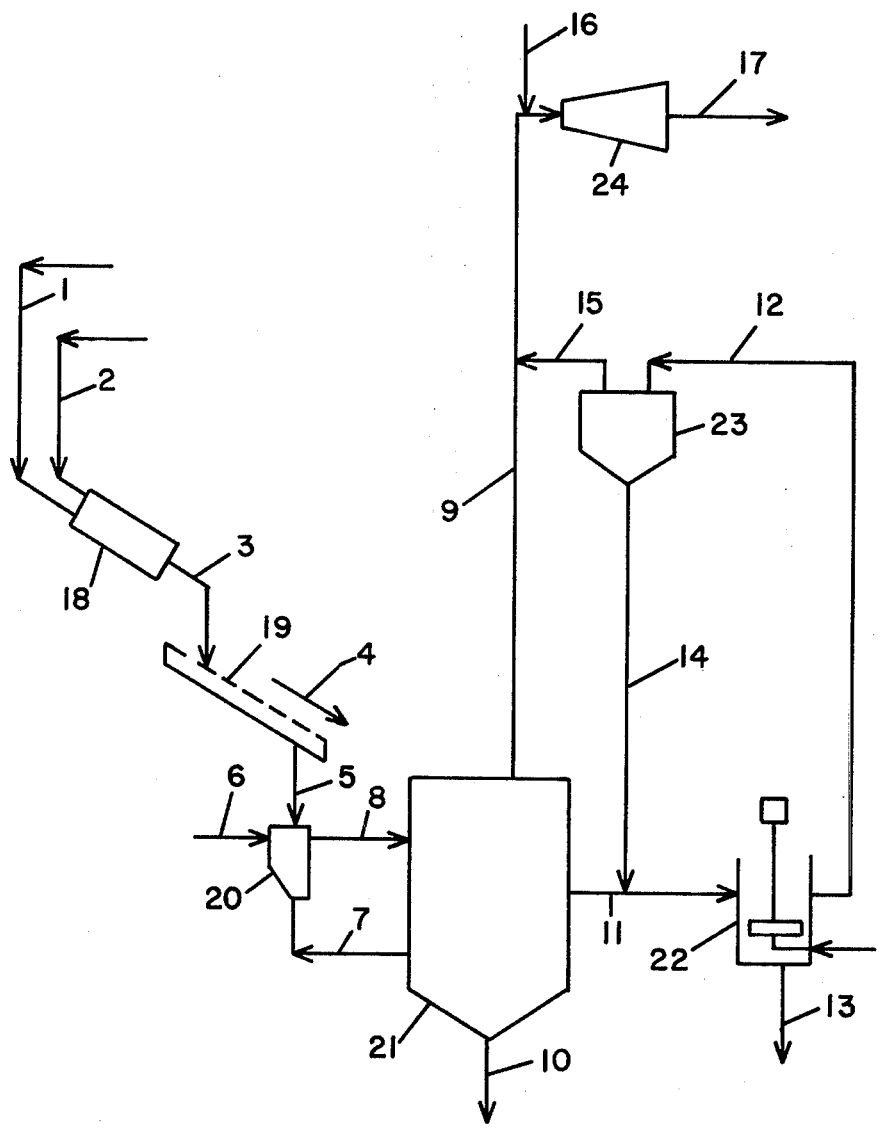

United States Patent [19]
Baillie et al.

[11] B 3,986,592
[45] Oct. 19, 1976

[54] HOT WATER EXTRACTION CELL CONTAINING TWO OR MORE DEFLECTION BAFFLES

[75] Inventors: Robert A. Baillie, West Chester, Pa.; H. James Davitt, Edmonton; David E. Rose, Calgary, both of Canada

[73] Assignee: Great Canadian Oil Sands Limited, Toronto, Canada

[22] Filed: Nov. 4, 1974

[21] Appl. No.: 520,384

[44] Published under the second Trial Voluntary Protest Program on January 27, 1976 as document No. B 520,384.

[52] U.S. Cl.............................. 196/14.52; 208/11 LE; 210/521; 210/528
[51] Int. Cl.².................. B01D 11/02; C10G 1/04
[58] Field of Search................. 196/14.52; 208/11; 210/520, 521, 522, 528

[56] References Cited
UNITED STATES PATENTS

| | | | |
|---|---|---|---|
| 2,502,490 | 4/1950 | Sweet | 210/528 X |
| 3,245,543 | 4/1966 | Levendusky et al. | 210/521 |
| 3,530,042 | 9/1970 | Graybill et al. | 196/14.52 |
| 3,847,789 | 11/1974 | Cymbalisty | 208/11 |

*Primary Examiner*—James H. Tayman, Jr.
*Attorney, Agent, or Firm*—J. Edward Hess; Donald R. Johnson

[57] ABSTRACT

A tank with an upwardly concave bottom, a rotatable center shaft running on the vertical axis of the tank from the top of the tank to the bottom, middlings outlets at the side of the tank, a sands discharge outlet at the bottom of the tank, an overflow means connected at the side of the tank, a sand rake connected to the center shaft to rotate with the shaft and positioned to move settled sand toward the sand discharge outlet and a means for rotating the center shaft, the improvement which comprises a combination of two or more saucer-shaped deflecting baffles located in the cell and concentric with the shaft and affixed thereto, the lowest baffle being located immediately above the sand rake, and inverted to the bottom of the cell and having a skirt extending downward from the outer periphery thereof and at least one other deflecting baffle being located in between the feed well and the lower baffle.

1 Claim, 2 Drawing Figures

3,986,592

HOT WATER EXTRACTION CELL CONTAINING TWO OR MORE DEFLECTION BAFFLES

BACKGROUND OF THE DISCLOSURE

This invention relates to an improved apparatus for the processing of tar sands. Large deposits of these sands are found as the Athabasca deposits in northern Alberta, Canada. The valuable portion of these deposits occupies about 5½ million acres and is buried by 0 to 2000 feet of overburden. It has been estimated that these deposits consist of about 600 billion barrels of reserves in place, over 350 billion barrels of recoverable reserves of raw tar sand oil and over 250 billion barrels of upgraded synthetic crude oil (See page 1 of the K. A. Clark Volume edited by M. S. Carrigy, Research Council of Alberta, Oct., 1963). The recoverable reserves estimate is just about equal to the world-wide reserves estimate of conventional oil, 60 percent of which is in the Middle East.

The tar sands are primarily composed of a fine quartz sand having a particle size greater than that passing a 325 mesh screen. The quartz sand is impregnated with a viscous bitumen in quantities of from 5 to 21 weight percent of the total composition. More typically the bitumen content is from 8 to 15 percent. This bitumen is quite viscous—6° to 8° API gravity—and contains typically 4.5 percent sulfur and 38 percent aromatics. Its specific gravity at 60°F. ranges typically from about 1.00 to about 1.06.

In addition to the bitumen and quartz sand, the tar sands contain clay and silt in quantities of from 1 to 50 weight percent of the total composition. Silt is normally defined as material which will pass a 325 mesh screen but which is larger than 2 microns. Clay is material smaller than 2 microns including some siliceous material of that size.

Several basic extraction methods have been known for many years for the separation of bitumen from the sands. In the so-called "cold water" method, the separation is accomplished by mixing the sands with a solvent capable of dissolving the bitumen constituent. The mixture is then introduced into a large volume of water, water with a surface agent added or a solution of a neutral salt in water. The combined mass is then subjected to a pressure or gravity separation.

In the hot water method, the bituminous sands are jetted with steam and mulled with a minor amount of hot water at temperatures in the range of 140° to 210°F. The resulting pulp is dropped into a stream of circulating hot water and carried to a separation cell maintained at a temperature of about 150° to 200°F. In the separation cell, sand settles to the bottom as tailings and bitumen rises to the top in the form of an oil froth. An aqueous middlings layer containing some mineral and bitumen is formed between these layers. A scavenger step may be conducted on the middlings layer from the primary separation step to recover additional amounts of bitumen therefrom. This step usually comprises aerating the middlings as taught by K. A. Clark, "The Hot Water Washing Method", Canadian Oil and Gas Industries, 3, 46 (1950). These froths can be combined, diluted with naphtha and centrifuged to remove more water and residual mineral. The naphtha is then distilled off and the bitumen is coked to a quality crude suitable for further processing.

DESCRIPTION OF THE INVENTION

The present invention relates to an improved separation cell specifically designed for use in the hot water process for treating tar sands. Since the separation of bitumen from tar sands by the hot water process presents problems not encountered in other separation processes, the design of a separation cell for this purpose is necessarily non-analogous to the problems faced in designing for other processes. For example, in the hot water process, it is necessary to provide sufficient residence time of the conditioned tar sands in the body of water to allow conditioned pulp to separate into its component parts. The froth which forms at the top of the cell and the sand layer at the bottom of the cell should be removed in such a way as not to disturb this part of the process.

Furthermore, it has been found that the separation of the tar sands to form the bitumen froth is dependent upon a delicate maintenance of the density of the middlings of the separation zone. This is achieved by circulating a portion of the aqueous middlings for mixture with bituminous sands before they are discharged into the separation zone. By adjusting the balance between the amount of fresh water and the amount of middlings recycle in the tar sands entering the separation zone, the density of the middlings in the zone can be adjusted. See Floyd et al. Canadian Pat. No. 841,581 issued May 12, 1970. A suitable separation cell should provide for this middlings recycle for proper operation of the process.

Also of importance in the recovery of bitumen from tar sands is a separation cell which provides that the tar sands pulp fed thereto will have sufficient residence time in the cell to affect separation of the tar sands into its component parts. The tendency of tar sands pulp to go directly from the feed well inlet to the sand discharge outlet (channelling) should be avoided if efficient recovery of bitumen froth from the feed is to be accomplished.

Canadian Pat. No. 882,667, issued Oct. 5, 1971 to Harold L. Erskine and Wilfred J. Daly discloses a hot water separation cell which has been found to be most useful in the hot water extraction method of recovering bitumen from tar sands as disclosed in the Floyd et al. patent noted above.

However, even this substantial advance in the art as disclosed by Erskine et al. still leaves room for further improvement in the development of apparatus for the extraction of bitumen from tar sands by the hot water procedure. Erskine et al. disclose a hot water process separation cell containing:

a. a tank with an upwardly concave bottom;
b. a rotatable center shaft on the vertical axis of said tank from the top of the tank toward the bottom;
c. a middlings outlet connected to the side of said tank for withdrawing middlings material from said cell;
d. a tar sands pulp inlet to said tank;
e. a sand discharge outlet at the bottom of said tank for withdrawing sand tailings layer from said cell;
f. an overflow means connected at the side of said circular tank and positioned adjacent to said tank to receive bitumen froth;
g. a froth skimmer, connected to said center shaft, to rotate with said shaft and positioned to direct floating bitumen froth to said overflow means;

h. a sand rake connected to said center shaft to rotate with said shaft and positioned to move settled sand toward said discharge outlet and i. a means for rotating said center shaft.

One of the problems encountered in the use of a separation cell as described above is often when the tar sand pulp is fed into the central feed well in the cell, a portion of the feed drops directly into the tailings discharge outlet of the vessel without having sufficient residence time to permit the separation of the tar sands to its component parts. As is well known, this phenomena is called channelling. Operation of the hot water extraction procedure under these conditions often results in a substantial amount of the bitumen fed into the separation vessel being removed via the tailings discharge outlet thereby substantially reducing the value of the tar sands being fed into the separation cell.

In order to provide a more attractive economic procedure for extraction of bitumen from tar sands, at least 90 percent of the bitumen in the tar sands should be recovered. In the case where fresh tar sands immediately fall to the bottom of the cell without separation into its component parts, the losses involved can be quite substantial and render the hot water separation process uneconomical. By the use of the improved separation cell of the present invention, losses due to channelling of tar sands from the feed inlet directly to the tailings outlet are substantially reduced so as to make the hot water process substantially more attractive economically.

The separation cell of this invention comprises a circular tank with a bottom and a rotatable center shaft on the vertical axis of the tank from the top towards its bottom, an inlet means for charging tar sands pulp, an overflow recovery means at the top of the tank and a sand rake attached to the center shaft. The cell is also provided with a discharge outlet at the center of the lowest portion of the bottom of the cell for removing water and solids. The improvement of the present invention comprises a combination of two or more deflecting shed baffles one of which is located immediately above the sand rake and is referred to as the lower or lowest baffle. All baffles are concentric with the vertical shaft running through the cell. The lower shed baffle is located immediately above the sand rake support arms and can extend from the shaft to a point between the end of the sand rakes and their connecting point on the rotating shaft. The other baffles can be located between the lower shed baffle and the feed well along the vertical shaft. The lower shed deflecting baffle can be described as preferably being a saucer-shaped member preferably having a skirt at the outer periphery thereof and placed in an inverted position upon the sand rakes so that the skirt extends downward from the outer periphery of the saucer to a point between the baffle and the bottom of the tank. The upper deflecting baffles can be defined as inverted saucer-shaped members concentric with the vertical shaft and located thereon between the feed well and the lower shed baffle immediately above the sand rake support arms. This improvement to the separation cell provides that when fresh tar sands pulp is fed into the cell, part of the feed which normally channels toward the bottom outlet is first deflected by the upper baffle into the intermediate portion of the cell. The remaining tar sands which continue to fall towards the sand outlet are deflected by the lower shed baffle into the middlings portion of the cell. This improvement increases residence time of most of the tar sands processed therein and thereby improves the separation of bitumen from the sand.

In order to more completely define the improvement of the present invention, the following detailed description with reference to drawings is provided.

Figure 2:
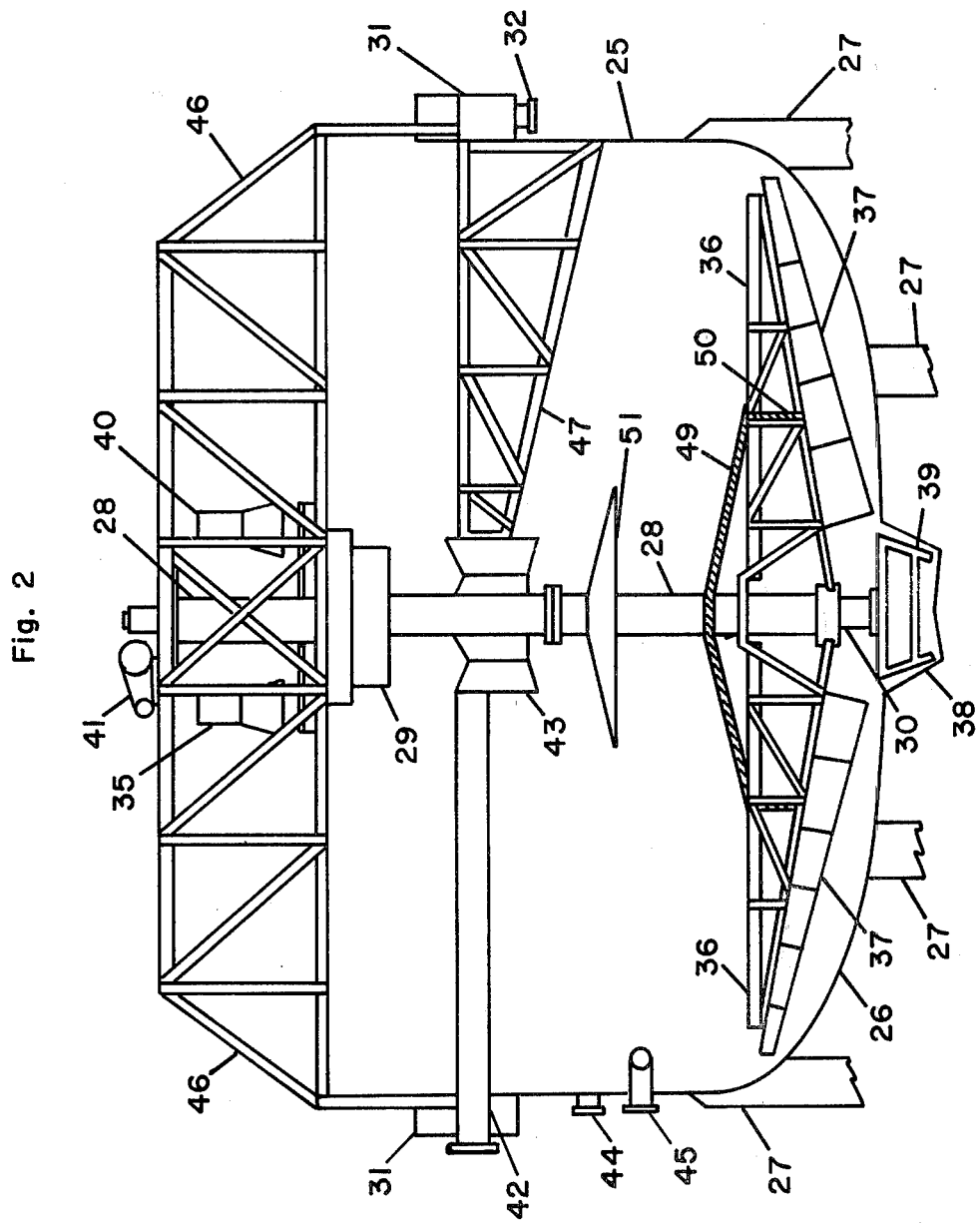

FIG. 1 of the drawings is a schematic representation of the hot water process in which the separation cell of the present invention is best utilized. FIG. 2 is an elevation view, partly in section, of the separation cell and shows the two middlings outlets, the tar sand feed, the tank center shaft, the sand discharge outlet, the overflow means, the sand rake with the inverted saucer-shaped skirted shed baffle affixed to the center rotating shaft arm of the sand rake, an upper inverted saucer-shaped baffle and the rotating means.

In FIG. 1, bituminous tar sands are fed into the system through line 1 where they first pass to a conditioning drum or muller 18. Water and steam are introduced from 2 and mixed with the sands. The total water so introduced is a minor amount based on the weight of the tar sands processed and generally is in the range of 10 to 45 percent by weight of the muller mixture. Enough steam is introduced to raise the temperature in the conditioning drum to a temperature in the range of 130° to 210°F. and preferably to above 170°F. Suitable alkaline reagent can also be added to the conditioning drum usually in amount of from 0.1 to 3.0 lbs. per ton of tar sand. The amount of such alkaline reagent preferably is regulated to maintain the pH of the middlings layer in separator zone 21 within the range of 7.5 to 9.0. Best results seem to be obtained at a pH value of 8.0 to 8.5. The amount of the alkaline reagent that needs to be added to maintain a pH value in the range of 7.5 to 9.0 may vary from time to time as the composition of the tar sands as obtained from the mine site varies. The best alkaline reagents to use for this purpose are caustic soda, sodium carbonate or sodium silicate, although any of the other suitable alkaline reagents can be used if desired.

Mulling of the tar sands produces a pulp which then passes from the conditioning drum as indicated by line 3 to a screen indicated at 19. The purpose of screen 19 is to remove from the tar sand pulp any debris, rocks or oversized lumps as indicated generally at 4.

The pulp then passes from screen 19 as indicated by 5 to a sump 20 where it is diluted with additional water from 6 and a middlings recycle stream 7. Recycling of the middlings is not essential in all cases, particularly when the clay content of the tar sands is high. In this event a relatively high rate of fresh feed water introduction through 6 can be employed to compensate for the high clay content while a correspondingly high rate of transfer of middlings layer through line 11 as hereinafter described can be maintained. Under these circumstances recycling of the other stream of middlings through line 7 to the sump or conditioning drum is not required.

Modifications that may be made in the process as above described include sending a minor portion of the middlings recycle stream from line 7 through a suitable line (not shown) to the conditioning drum 18 to supply all or a part of the water needed therein other than that suplied through condensation of the steam which is consumed. Also, if desired, a stream of the middlings recycle can be introduced onto the screen 19 to flush the pulp there through and into the sump.

The pulped and diluted tar sands are pumped from the sump 20 through line 8 into the separation zone 21. The separation zone comprises the improved settling cell of the present invention and will be described more in detail in reference to FIG. 2. The cell contains a relatively quiescent body of hot water which allows for the formation of a bitumen froth which rises to the cell top and is withdrawn via line 9, and a sand tailings layer which settles to the bottom to be withdrawn through line 10. An aqueous middlings layer between the froth and tailings layer contains silt and clay and some bitumen which failed to form froth. In order to prevent the buildup of clay in the system, it is necessary to continually remove some of the middlings layer and supply enough water in the conditioning operations to compensate for that so removed.

The amount of bitumen remaining in the middlings layer appears to be more or less related to the percentage of clay and/or silt present in the tar sands being processed, varying directly with the amount of clay and/or silt present. For example, typical oil recovery values for the froth from tar sands in which 15 percent of the mineral matter is less than 44 microns and from sands in which 25 to 30 percent is less than this size are respectively, 85 percent and 60 percent. For commercial operation it is highly desirable to obtain increased recoveries over such values as these which are obtainable heretofore by the hot water process. This is particularly true when the tar sands as mined contain a relatively high proportion of clay and silt components.

The oil-rich middlings stream withdrawn from separator 21 through line 11 is sent to a scavenger zone 22 wherein an air flotation operation is conducted to cause the formation of additional bitumen froth. Bitumen froth is passed from the scavenger zone 22 through line 12 to a froth settler zone 23. An oil-lean middlings stream is removed and discarded from the bottom of the scavenger zone 22 via line 13.

In the settler zone 23, the scavenger froth forms into a lower layer of settler tailings which is withdrawn and recycled via line 14 to be mixed with oil-rich middlings for feed to the scavenger zone 22 via line 11. In the settler zone, an upper layer of upgraded bitumen froth forms above the tailings and is withdrawn through line 15 and mixed with primary froth from line 9 for further processing. The use of gravity settling to upgrade scavenger cell froth is disclosed and claimed in Dobson, Canadian Pat. No. 857,306 issued Dec. 1, 1970.

The combined froths are at a temperature of about 160°F. They are heated with steam and diluted with sufficient naphtha or other diluent from 16 to reduce the viscosity of the bitumen for centrifuging in zone 24 to produce a bitumen product 17 suitable for further processing.

Details of the separation cell 21 are shown in FIG. 2. The cell consists of a tank 25 which can be employed in various forms. The tank shown is circular with an upwardly concave bottom 26 set on supports 27 and provided with rotatable shafts 28 and 30 arranged concentrically to one another on the vertical axis of tank 25. The tank is provided with an overflow launder 31 which is positioned at the top of the tank, peripherially around its circumference. This launder 31 is provided for receiving froth which is then discharged into an overflow outlet 32 for conveying through line 9 to the centrifuge zone 24 of FIG. 1.

The sand rake positioned on center shaft 28 consists of a plurality of support arms 36 with connected blades 37 which direct sand to the discharge cone 38 which is connected to the sand tailings discharge line 10 of FIG. 1. The cone scraper 39 is an optional feature of the cell and is attached to shaft 30 which is driven by motor 35. Shaft 28 is driven by motor 40. The lifting device and motor 41 provide another alternative feature in the cell and can be used to raise and lower the sand rake 36 to adjust to the level of the sand tailings layer. The pulp feed conduit 42 is attached to line 8 of FIG. 1 and provides for delivering tar sands pulp through the tank 25 to the feed well 43 which is supported by feed well support 47.

The upper middlings conduit 44 is provided at the side of the tank 25 for conveying oil-rich middlings to line 11 of FIG. 1 for secondary recovery in scavenger zone 22. The lower middlings conduit 45 is positioned at the side of the tank at a point lower than the upper middlings conduit 44. The lower middlings conduit removes middlings to line 7 for recycle to the sump 20. The recycle is used to maintain the viscosity or density of the middlings contained in the tank 25. Although only one lower middlings conduit 45 and one upper middlings conduit 44 are shown, a plurality of conduits provided around the circumference of the tank can be utilized. 46 is a walkway and handrail.

Attached to shaft 28 with which it is concentric and also attached to the sand rake support arms 36 is the lower shed deflection baffle 49 with the downwardly extending skirt 50 attached to the outer periphery of the baffle. This baffle is preferably saucer-shaped and in an inverted position. The baffle extends outwardly from the shaft thereby providing a means by which a part of the tar sands exiting from the feed well 43 are inhibited from channelling directly from the feed well into tailings exit 38.

Also attached to shaft 28 is one or more upper shed deflecting baffles 51 defined as inverted saucer-shaped members affixed to and concentric with the center shaft and located at any point between the feed well 43 located in the upper portion of the separation cell and the lower shed baffle 49 located immediately above the sand rake support arms 36. Although only one upper shed deflecting baffle is shown in FIG. 2, this is merely illustrative and represents at least one baffle and can be defined to include 2 to 10 shed baffles.

The following example defined in connection with FIG. 1, illustrates, in a general way, a hot water process utilizing the separation cell which is the object of the present invention.

On an hourly basis a sufficient amount of the tar sands to give 1000 tons in the feed after screening is fed via base line 1, along with 300 tons of water and steam fed via line 2, into a conditioning drum 18. The mixture is heated to about 180°F. while being mulled. The resulting pulp is passed through a screen 19 which rejects material of a size ¾ inch and larger as indicated at 4. At a sump 20 the screened pulp is mixed continuously with hot water from line 6 at 190°F. in the amount of 500 tons and with a middlings recycle stream from line 7 in the amount of 2000 tons. The diluted pulp is then pumped via line 8 to a separation zone 21 which comprises a single tank with an upwardly concave bottom. The tank also contains rotatable center shafts connected to a sand rake and has a shed deflection baffle attached to the shaft at the bottom of the tank. The sand rake rotates at about 0.5 revolutions per minute. In the cell the diluted pulp separates into a bitumen froth which floats to the top of the tank which overflows into a launder and into a sand layer which falls to the bottom of the tank and is raked to a discharge outlet.

Sand tailings are removed from the tank at the rate of about 1020 tons per hour and froth is removed from the launder at a rate of about 40 tons per hour. A bitumen content in the froth corresponding to a recovery of more than 60 percent of the bitumen in the original tar sands is obtained. A stream of oil-rich middlings in the amount of 740 tons per hour is withdrawn from the tank through an outlet 44 and transferred via line 11 to a scavenger zone 22 where it is subject to air flotation. Additional oil froth is obtained from the secondary recovery in an amount of 170 tons per hour and is withdrawn via line 12. About 965 tons per hour of oil-lean middlings are withdrawn and discarded from zone 22 via line 13. The secondary froth is settled in separation cell 23 and added to the primary froth in line 9 via line 15 to give a recovery of oil from the tar sands of an over-all value of greater than 90 percent.

The deflecting baffles herein disclosed are generally in the form of saucer-shaped members concentric with the center vertical shaft within the cell but other deflecting shapes are suitable. The baffle preferably is circular but is not limited to that configuration. The baffle can be a quadrangular-shape, a hexagonal shape, an octagonal shape or have any other suitable configuration on its outer periphery. The lower shed baffle located immediately above the sand rake support arms baffle is suitable for use with or without a downwardly extending skirt. Preferably this shed baffle has affixed to its outer periphery a downwardly extending skirt which terminates immediately above the blades of the sand rakes. The baffle can be affixed to the center shaft or can be affixed to the support arms of the sand rakes or both. The skirt is normally parallel to the tank wall but can be disposed at an angle thereto also. The upper one or more baffles can be located on the center shaft in the cell at any point between the feed well outlets and the lower shed baffle located immediately above the sand rake support arms. All baffles can extend in size to any point between the center shaft and the tank well as determined by the composition of the feed material being processed and the rate of solids removal from the bottom of the cell. Generally, the lower shed baffle should at least cover the opening in the bottom of the cell. The lower shed baffle is normally larger in surface area than the other shed baffles in the cell.

The preferred separation cell suitable for use in the hot water method of extracting bitumen from tar sands comprises:
a. a tank with an upwardly concave bottom;
b. a rotatable center shaft running on the vertical axis of the tank from the top toward the bottom of the tank;
c. a means for rotating said shaft;
d. middlings outlets connected to the side and communicating with the interior of the tank for withdrawing middlings material from the cell;
e. a tar sands pulp inlet means to the tank said means having an inlet at one end and communicating with the exterior of said cell and a discharage outlet at the opposite end within the tank and having a feed well at its discharge end;
f. a sand discharge outlet at the bottom of the tank for withdrawing sand tailings from the cell;
g. an overflow means connected at the side of the tank and positioned adjacent to the tank to receive bitumen froth;
h. a sand rake connected to said center shaft to rotate with the shaft and positioned to move settled sand toward said sand discharge outlet;
i. a lower saucer-shaped shed baffle extending from said shaft and concentric therewith in an inverted position in said cell and located on the shaft at a point immediately above the sand rake and
j. an upper saucer-shaped shed baffle affixed to and extending from said shaft and concentric therewith in an inverted position in said cell and located on the shaft at a point between the feed well and the lower saucer-shaped baffle.

Generally the improved separation cell of the present invention is a flotation cell for separating a first material from a second material, comprising in combination:
a. a tank;
b. an inlet means for feeding a liquid mixture of said first and second materials to said tank;
c. means for withdrawing said first material from the top of said tank;
d. an outlet in the bottom of said tank for withdrawing said second material therefrom;
e. a rotatable center shaft on the verticle axis of said tank from the top toward the bottom having a means (affixed to the lower end of said shaft) for moving said second material to said outlet in the bottom;
f. a first deflecting baffle located immediately above said sand rake on said shaft, and being concentric with said shaft, said baffle being of sufficient size to cover said bottom outlet; and
g. a second deflecting baffle extending from and being concentric with, said shaft and being located above said first baffle and below said inlet means.

The invention claimed is:
1. In a hot water process separation cell suitable for recovering bituminous froth from tar sands comprising;
a. a tank;
b. a rotatable center shaft running on the vertical axis of the tank from the top toward the bottom of the tank;
c. a means for rotating said shaft;
d. middlings outlets connected to the side and communicating with the interior of the tank for withdrawing middlings from the cell;
e. a tar sands pulp inlet means to the tank, said means having an inlet at one end and communicating with the exterior of said cell and a discharge outlet located within said tank at the opposite end of said inlet means and having a feed well at its discharge end;
f. a sand discharge outlet at the bottom of the tank for withdrawing sand tailings from the cell;
g. an overflow means connected at the side of the tank and positioned adjacent to the tank to receive bituminous froth;
h. a sand rake connected to said center shaft to rotate with the shaft and positioned to move settled sand toward said sand discharge outlet; the improvement which comprises
   i. and inverted saucer shaped baffle affixed immediately above said sand rakes and extending from and concentric with said shaft and having a skirt affixed to the outer periphery of said baffle and extending downward to a point between said baffle and the bottom of said tank; and
   ii. a second inverted saucer shaped baffle extending from said shaft and concentric therewith located immediately below the outlet of said feed well.

* * * * *